US009634359B2

(12) United States Patent
Jones et al.

(10) Patent No.: US 9,634,359 B2
(45) Date of Patent: Apr. 25, 2017

(54) ELECTROLYTE FOR ZINC-BASED RECHARGEABLE BATTERIES, METHOD FOR PRODUCING THE SAME AND BATTERIES INCLUDING SAID ELECTROLYTE

(75) Inventors: Monica Meckfessel Jones, Simi Valley, CA (US); George W. Adamson, Princeton Junction, NJ (US)

(73) Assignee: ZPower, LLC, Camarillo, CA (US)

( * ) Notice: Subject to any disclaimer, the term of this patent is extended or adjusted under 35 U.S.C. 154(b) by 716 days.

(21) Appl. No.: 13/885,194

(22) PCT Filed: Nov. 14, 2011

(86) PCT No.: PCT/US2011/060511
§ 371 (c)(1),
(2), (4) Date: May 29, 2013

(87) PCT Pub. No.: WO2012/067977
PCT Pub. Date: May 24, 2012

(65) Prior Publication Data
US 2013/0244101 A1     Sep. 19, 2013

Related U.S. Application Data

(60) Provisional application No. 61/413,523, filed on Nov. 15, 2010.

(51) Int. Cl.
*H01M 10/26*     (2006.01)
*H01M 2/16*      (2006.01)
(Continued)

(52) U.S. Cl.
CPC ......... *H01M 10/26* (2013.01); *H01M 2/1626* (2013.01); *H01M 2/1653* (2013.01);
(Continued)

(58) Field of Classification Search
None
See application file for complete search history.

(56) References Cited

U.S. PATENT DOCUMENTS 3,057,944 A   10/1962   Ruetschi et al.
3,653,965 A    4/1972   Lee
(Continued)

FOREIGN PATENT DOCUMENTS

GB         902846      8/1962
JP       56-116274     9/1981
(Continued)

OTHER PUBLICATIONS

Adler, T. C., et al., "Low-Zinc-Solubility Electrolytes for Use in Zinc/Nickel Oxide Cells", Journal of the Electrochemical Society, vol. 140, No. 2, Feb. 1993, pp. 289-294.

(Continued)

*Primary Examiner* — Scott J Chmielecki
(74) *Attorney, Agent, or Firm* — Honigman Miller Schwartz and Cohn LLP; Andrew N. Weber; Jonathan P. O'Brien

(57) ABSTRACT

The present invention provides an electrolyte comprising polymer comprising alkyl-capped PEG; an alkaline agent; and water, wherein the water is present in an amount greater than or equal to about 60 wt % of the electrolyte and methods of producing the same. The present invention further provides an electrochemical cell comprising said electrolyte, and methods of producing the same. The present invention also provides a separator comprising alkyl-capped PEG and cellulose, and methods of producing the same.

18 Claims, 1 Drawing Sheet

(51) Int. Cl.
*H01M 10/32* (2006.01)
*H01M 4/38* (2006.01)
*H01M 4/54* (2006.01)

(52) U.S. Cl.
CPC ............. *H01M 10/32* (2013.01); *H01M 4/38* (2013.01); *H01M 4/54* (2013.01); *H01M 2300/0014* (2013.01); *Y02E 60/124* (2013.01); *Y02P 70/54* (2015.11)

(56) References Cited

U.S. PATENT DOCUMENTS

| | | | |
|---|---|---|---|
| 4,078,127 A | 3/1978 | Megahed et al. | |
| 4,209,574 A | 6/1980 | Ruetschi | |
| 4,778,737 A | 10/1988 | Sehm | |
| 5,215,836 A * | 6/1993 | Eisenberg | H01M 10/26 429/199 |
| 5,302,475 A | 4/1994 | Adler et al. | |
| 5,330,371 A | 7/1994 | Andrews | |
| 5,541,021 A | 7/1996 | Watanabe et al. | |
| 5,585,208 A | 12/1996 | Lian et al. | |
| 5,681,672 A | 10/1997 | Lee | |
| 5,693,432 A | 12/1997 | Matsumoto | |
| 5,731,105 A | 3/1998 | Fleischer et al. | |
| 5,743,000 A | 4/1998 | Ekern | |
| 5,795,679 A | 8/1998 | Kawakami et al. | |
| 5,830,601 A | 11/1998 | Lian et al. | |
| 6,022,637 A * | 2/2000 | Wilson | H01M 6/14 429/103 |
| 7,026,071 B2 | 4/2006 | Mayes et al. | |
| 7,544,444 B2 | 6/2009 | Adachi et al. | |
| 2002/0048706 A1 | 4/2002 | Mayes et al. | |
| 2002/0182489 A1 | 12/2002 | Cheiky et al. | |
| 2003/0152815 A1* | 8/2003 | LaFollette | H01M 2/0202 429/7 |
| 2004/0018427 A1* | 1/2004 | Monconduit | H01M 6/5077 429/205 |
| 2005/0101727 A1* | 5/2005 | Amalric | A61K 8/042 524/801 |
| 2005/0181280 A1 | 8/2005 | Ceder et al. | |
| 2006/0147809 A1 | 7/2006 | Amine et al. | |
| 2006/0204844 A1 | 9/2006 | Costanzo | |
| 2007/0125988 A1 | 6/2007 | Howard | |
| 2008/0165472 A1* | 7/2008 | Chien | H01G 9/035 361/504 |
| 2010/0119941 A1 | 5/2010 | Niessen et al. | |
| 2010/0291437 A1* | 11/2010 | Abe | C07C 309/65 429/207 |
| 2011/0104526 A1* | 5/2011 | Boxley | H01M 2/1646 429/50 |
| 2011/0123859 A1 | 5/2011 | Huang et al. | |

FOREIGN PATENT DOCUMENTS

| | | | |
|---|---|---|---|
| WO | 02/086992 | 10/2002 | |
| WO | 2005/112155 | 11/2005 | |
| WO | 2008/039419 | 4/2008 | |
| WO | 2009/120351 | 10/2009 | |
| WO | WO 2009120351 A1 * | 10/2009 | ............. H01M 4/32 |

OTHER PUBLICATIONS

Armand, M. B., et al., "Poly-Ethers As Solid Electrolytes", Elsevier North Holland, Inc., 1979, pp. 131-136.
Datasheet of Pluronic L 64.
Fauvarquet, J. F., et al., "Alkaline Poly(Ethylene Oxide) Solid Polymer Electrolytes. Application to Nickel Secondary Batteries", Electrochica. Acia., vol. 40, No. 14, 1995, pp. 2449-2453.
Guinot, S., et al., "Alkaline Solid Polymer Electrolyte Ni/Zn Secondary Batteries", Electrochemical Society Proceedings, vol. 95, No. 14, pp. 182-189.
International Search Report for PCT/US2002/012441 dated Jul. 3, 2002.
International Search Report for PCT/US2009/001887 dated Aug. 11, 2009.
International Search Report for PCT/US2011/060511 Dated Jul. 10, 2012.
Kumar, M. Selva, et al., "Polyvinal alcohol-polystyrene sulphonic acid blend electrolyte for supercapacitor application", Physica B, Elsevier, Amsterdam, NL, vol. 404, No. 8-11, May 1, 2009, pp. 1143-1147.
Sang, Shangbin, et al., "Influences of doping approach on conductivity of composite alkaline solid polymer electrolyte PVA-HA-KOH-H2O", Electrochimica Acta, Elevier, GB, vol. 53, No. 15, Nov. 22, 2007, pp. 5065-5070.
Thornton, Roy F., et al., "Properties of Alternate Electrolytes for Secondary Zinc Batteries", Journal of the Electrochemical Society, vol. 127, No. 7, Jul. 1980, pp. 1448-145.

* cited by examiner

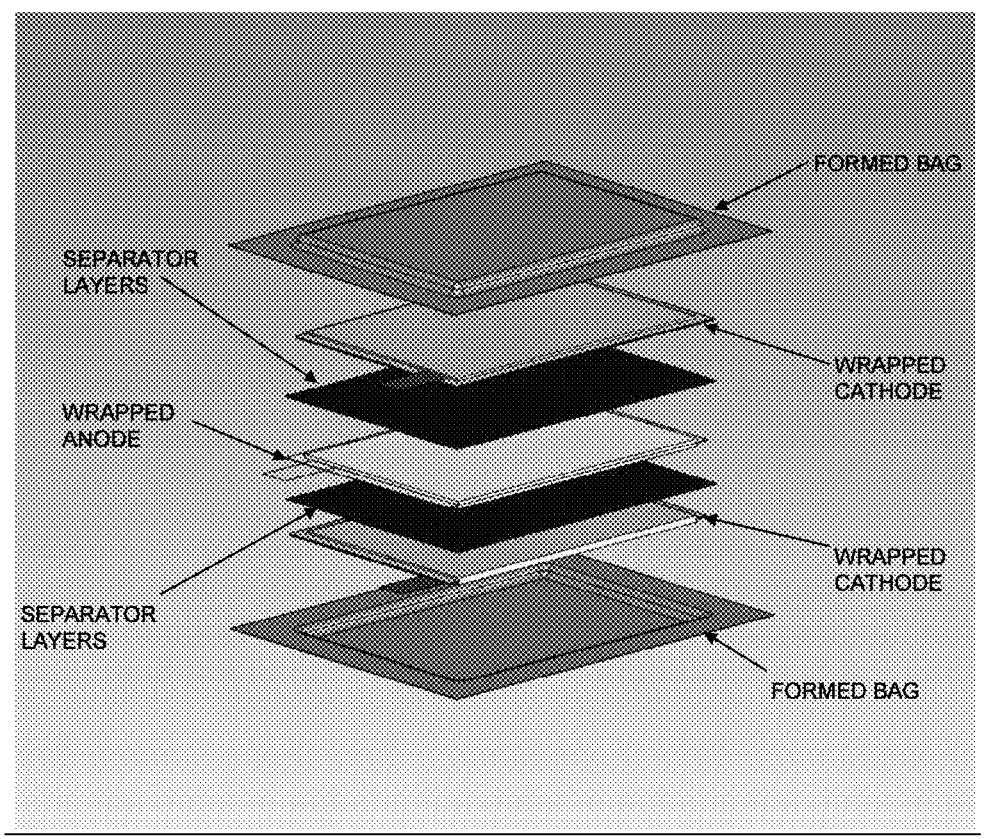

ELECTROLYTE FOR ZINC-BASED RECHARGEABLE BATTERIES, METHOD FOR PRODUCING THE SAME AND BATTERIES INCLUDING SAID ELECTROLYTE

CROSS REFERENCE TO RELATED APPLICATION

This U.S. patent application claims the benefit of PCT application no. PCT/US2011/060511, filed on Nov. 14, 2011, which claims the benefit of U.S. provisional application Ser. No. 61/413,523, filed on Nov. 15, 2010. The entire contents of these applications are incorporated herein by reference.

FIELD OF THE INVENTION

The present invention relates to novel polymer-plasticized separators and electrochemical cells using such plasticized separators.

BACKGROUND OF THE INVENTION

Most electrochemical cells used in electrical storage batteries comprise an electrolyte interposed between and in contact with an anode and a cathode. The anode comprises an active material that is readily oxidized, and the cathode comprises an active material that is readily reduced. During discharge, the anode active material is oxidized and the cathode active material is reduced, so that electrons flow from the anode through an external load to the cathode, and ions flow through the electrolyte between the electrodes.

Many electrochemical cells used in electrical storage batteries also include a separator between the anode and the cathode to prevent reactants and reaction products present at one electrode from reacting and/or interfering with reactions at the other electrode. In modern batteries, anodes and cathodes may be in close physical proximity, and thus, to be effective, a battery separator must be electronically insulating, and remain so during the life of the battery to avoid battery self-discharge via internal shorting between the electrodes. In addition, a battery separator must remain a sufficiently good ionic conductor of ions, to avoid excessive separator resistance that substantially lowers the discharge voltage, while at the same time remaining a barrier to diffusion of deleterious reactants and reactant products to the opposite electrode.

Electrical storage batteries are classified as either "primary" or "secondary" batteries. Primary batteries involve at least one irreversible electrode reaction and may not be recharged with useful charge efficiency by applying a reverse voltage. Secondary batteries involve relatively reversible electrode reactions and may be recharged over numerous charge-discharge cycles with an acceptable loss of charge capacity. Since the separator must survive repeated charge-discharge cycles, separator requirements for secondary batteries tend to be more demanding.

For many secondary batteries comprising a highly oxidative cathode, a highly reducing anode, and an alkaline electrolyte, separator requirements are particularly stringent. The separator must be chemically stable in a strongly alkaline solution, resist oxidation in contact with the highly oxidizing cathode, and resist reduction in contact with the highly reducing anode. Since ions, especially metal oxide ions, from the electrodes may often be somewhat soluble in alkaline solutions and be chemically reduced to metal on separator surfaces, the separator must also inhibit transport and/or chemical reduction of metal ions. Otherwise, a buildup of metal deposits within separator pores may increase the separator resistance in the short term, and in the long term, may cause shorting failure due to formation of a continuous metal path through the separator.

In addition, because of the strong tendency of many anodes to form dendrites during charging, the separator must suppress dendritic growth and/or physically resist dendrite penetration to avoid failure due to an electrolyte leak or formation of a dendritic short between the electrodes. A related issue with anodes is shape change, in which the central part of the electrode tends to thicken during charge-discharge cycling. The causes of shape change are complicated and not well understood but may involve differentials in the current distribution and solution mass transport along the electrode surface. The separator preferably mitigates electrode shape change by exhibiting uniform and stable ionic conductivity and ionic transport properties.

Zinc alkaline and particularly zinc-silver rechargeable batteries are used in many applications because of their high power density. These batteries possess one of the highest gravimetric and volumetric energy densities of commercially available batteries. Additionally, traditional zinc batteries possess low self-discharge rates as well as high current discharges upon demand.

However, traditional zinc batteries with traditional separators suffer a number of limitations. For example, these batteries suffer from a sharp decline in capacity with usage that results in a short charge/discharge cycle life, e.g., lasting less than 50 cycles when subjected to field conditions with infrequent cycling, short overall service life, or both. This sharp reduction in capacity is predominantly caused by secondary chemical reactions that occur in zinc battery cells. These secondary chemical reactions may cause the degradation of the electrolyte, a change of the scope of the anode electrode due to excessive zinc solubility in an aqueous electrolyte, a degradation of the electrode separator via silver migration and plating, and premature localized shorts due to the formation of dendrites on the zinc electrode. It is also noted that these deleterious secondary reactions may be brought about by overcharging the battery during recharge.

For improved performance, separators in zinc alkaline and zinc silver batteries must satisfy many of the numerous and often conflicting requirements listed above. Specifically, zinc battery separators are required to be resistant to electrochemical oxidation and silver ion transport from the cathode and resistant to electrochemical reduction and dendrite penetration from the anode.

Cellulose separators, in the form of regenerated cellulose separators, have often been used in zinc-based batteries, such as for example, zinc alkaline and zinc silver batteries, because of their ability to allow negative $OH^-$ ions through the membrane in high alkaline environments with low electrical resistivity while resisting the passage of metal ions. Over time, however, cellulose separators decompose chemically in alkaline electrolytes, which limits the useful life of the battery. They are also subject to chemical oxidation by soluble silver ions and electrochemical oxidation in contact with silver electrodes. Furthermore, some cellulose separators may exhibit low mechanical strength and poor resistance to penetration by dendrites.

To solve some of the problems caused by traditional separators, new separator materials have been developed.

SUMMARY OF THE INVENTION

One aspect of the present invention provides an electrolyte comprising alkyl-capped polyethylene glycol (PEG); an alkaline agent; and water, wherein the electrolyte comprises at least about 60 wt % water by weight of the electrolyte.

In one embodiment, the alkyl-capped PEG comprises a polymer of formula (I), defined below, wherein the polymer of formula (I) has a total molecular weight of from about 100 amu to about 10,000 amu. In other embodiments, the alkyl-capped PEG has a molecular weight of from about 250 to about 2000 amu (e.g., from about 500 amu to about 1500 amu). In other embodiments the alkyl-capped PEG comprises methyl-capped PEG (mPEG), ethyl-capped PEG (ePEG), propyl-capped PEG (pPEG), or any combination thereof. In some embodiments, the alkyl-capped PEG has a glass transition temperature of about +40° C. or less. In other embodiments, the alkyl-capped PEG has a glass transition temperature of about −20° C. or less.

In some embodiments, the electrolyte further comprises from about 5 wt % to about 45 wt % or from about 30 wt % to about 40 wt % of alkaline agent by weight of electrolyte. In some embodiments, the alkaline agent comprises LiOH, NaOH, KOH, CsOH, RbOH, or any combination thereof. In some embodiments, the electrolyte comprises KOH. In some embodiments, the alkaline agent comprises about 60 wt % or greater KOH by weight of the alkaline agent. In some aspects, the alkaline agent further comprises NaOH. In some embodiments, the alkaline agent comprises from about 1 wt % to about 40 wt % NaOH by weight of the alkaline agent. The alkaline agent, in some embodiments, may comprise a mixture of KOH and NaOH. For example, the alkaline agent may comprise from about 60 wt % KOH:40 wt % NaOH to about 90 wt % KOH:10 wt % NaOH by weight of the alkaline agent. The alkaline agent may comprise about 80 wt % KOH:20 wt % NaOH by weight of the alkaline agent.

In some embodiments, the electrolyte further comprises sodium tetraborate. For example, the electrolyte comprises about 10 wt % or less of sodium tetraborate by weight of the electrolyte. In some embodiments, the electrolyte comprises about 85 wt % of water by weight of the electrolyte.

Another aspect of the present invention provides an electrolyte comprising mPEG; an alkaline agent comprising KOH and NaOH; sodium tetraborate; and water, wherein the water is present in an amount about 85 wt % of the electrolyte.

Another aspect of the present invention provides an electrochemical cell comprising an anode comprising Zn; a cathode comprising a silver material; a separator comprising cellulose; and an electrolyte comprising an alkyl-capped PEG, an alkaline agent, and water, wherein the electrolyte comprises about 60 wt % or more of water by weight of the electrolyte.

In some embodiments, the polymer comprises a polymer of formula (I), and has a mean molecular mass of from about 100 amu to about 10,000 amu. In some embodiments, the alkyl-capped PEG has a mean molecular weight of about 250 to about 2000 amu. In some embodiments, the alkyl-capped PEG comprises methyl-capped PEG (mPEG), ethyl-capped PEG (ePEG), propyl-capped PEG (pPEG), or any combination thereof. In some embodiments, the alkyl-capped PEG has a glass transition temperature of about −20° C. or less.

In some embodiments, the electrolyte comprises from about 5 wt % to about 45 wt % of alkaline agent or from about 30 wt % to about 40 wt % by weight of the electrolyte. In some embodiments, the alkaline agent comprises LiOH, NaOH, KOH, CsOH, RbOH, or any combination thereof. In some embodiments, the alkaline agent comprises KOH. For instance, the alkaline agent may comprise about 60 wt % or greater of KOH by weight of the alkaline agent. In some embodiments, the alkaline agent comprises NaOH. The alkaline agent may, in some embodiments, comprise from about 1 wt % to about 40 wt % of NaOH by weight of the alkaline agent. The alkaline agent, in some embodiments, may comprise a mixture of KOH and NaOH in an amount of from about 60 wt % KOH:40 wt % NaOH to about 90 wt % KOH:10 wt % NaOH by weight of the alkaline agent. The electrolyte may comprise about 80 wt % KOH:20 wt % NaOH by weight of the alkaline agent. In some embodiments, the electrolyte further comprises sodium tetraborate. In some aspects, the electrolyte comprises about 10 wt % or less of sodium tetraborate by weight of the electrolyte. In some aspects, the electrolyte comprises about 85 wt % of water by weight of the electrolyte.

In some embodiments, the anode, cathode, or both further comprise a binder comprising PVDF, PTFE, or any combination thereof.

Another aspect of the present invention provides a method of producing an electrolyte comprising providing alkyl-capped PEG; providing an alkaline agent; and providing water; combining the alkyl-capped PEG, the alkaline agent, and the water to generate the electrolyte, wherein the electrolyte comprises about 60 wt % or greater of water by weight of the electrolyte.

In some methods, the alkyl-capped PEG comprises a polymer of formula (I) and has a mean molecular weight of from about 100 amu to about 10,000 amu. In some methods, the alkyl-capped PEG has a mean molecular weight from about 250 amu to about 2000 amu. In some methods, the alkyl-capped PEG comprises methyl-capped PEG (mPEG), ethyl-capped PEG (ePEG), propyl-capped PEG (pPEG), or any combination thereof. In some methods, the alkyl-capped PEG has a glass transition temperature of at most about +40° C.

Other methods comprise providing from about 5 wt % to about 45 wt % (e.g., from about 30 wt % to about 40 wt %) of alkaline agent by weight of the electrolyte. In some methods, the alkaline agent comprises LiOH, NaOH, KOH, CsOH, RbOH, or any combination thereof. In some methods, the alkaline agent comprises NaOH, KOH, or a combination thereof. Some methods further comprise providing from about 0.1 wt % to about 5 wt % of sodium tetraborate by weight of the electrolyte.

Another aspect of the present invention provides a method of producing an electrochemical cell comprising providing an anode comprising zinc; providing a cathode comprising a silver material; providing a separator comprising cellulose; and providing an electrolyte comprising an alkyl-capped PEG, an alkaline agent, and water, wherein the electrolyte comprises about 60 wt % or more of water by weight of electrolyte.

Another aspect of the present invention provides a method of producing a separator comprising providing an alkyl-capped PEG; providing cellulose; and combining the cellulose with the alkyl-capped PEG. In some methods, the alkyl-capped PEG comprises a polymer of formula (I), and has a mean molecular weight of from about 100 amu to about 10,000 amu. In some methods, the alkyl-capped PEG has a mean molecular weight of between about 250 amu to about 2000 amu. In some methods, the alkyl-capped PEG has a glass transition temperature of about +40° C. or less.

Some methods further comprise providing alkyl-capped PEG in a mixture that comprises a small carbon chain alcohol. In some methods, the small carbon chain alcohol comprises a $C_{1-8}$ alcohol. For example, the small carbon chain alcohol comprises methanol, ethanol, n-propanol, isopropanol, butanol, or any combination thereof.

Some methods further comprise providing alkyl-capped PEG in a mixture that comprises an alkaline agent and water. In some aspects, the alkaline agent is selected from LiOH, NaOH, KOH, CsOH, RbOH, or any combination thereof. In some aspects, the aqueous alkaline agent comprises greater than 60 wt % water by weight of the mixture.

In some methods, the cellulose comprises a film. In other aspects, the cellulose comprises a mixture comprising a solvent.

BRIEF DESCRIPTION OF THE FIGURES

FIG. 1 is a cross-sectional view of a zinc-silver battery containing a cellulose separator according to the invention.

The examples described in the figures above are by way of example only and not intended to limit the scope of the present invention.

DETAILED DESCRIPTION

The present invention provides methods and compositions for providing electrolytes, cellulose separators, and electrochemical cells with improved properties.

In one aspect, the present invention provides electrolytes and methods of producing improved electrolytes capable of plasticizing and/or maintaining plasticity of a cellophane separator in situ in an electrochemical cell. For example, one embodiment provides an electrolyte comprising alkyl-capped PEG; an alkaline agent; and water, wherein the water comprises at least 60 wt % by weight of the electrolyte.

The present invention further provides electrochemical cells and methods of producing electrochemical cells comprising an anode comprising zinc, a cathode comprising a silver compound, a cellulose separator, and an electrolyte comprising an alkyl-capped PEG, an alkaline agent, and water, wherein the electrolyte comprises at least 60 wt % water by weight of the electrolyte.

The present invention further provides methods of producing a separator comprising providing cellulose, providing alkyl-capped PEG, and combining the cellulose with the alkyl-capped PEG. In some aspects, the cellulose is provided in the form of a membrane or film. In some aspects, the cellulose is provided in a mixture comprising a solvent.

I. DEFINITIONS

As used herein, "liquid" refers to one of the four principal states of matter. A liquid is a fluid that may freely form a distinct surface at the boundaries of its bulk material. For example, a polymer may be liquid at temperatures above its $T_g$ or at temperatures at least as high as its melting temperature.

As used herein, an "electrolyte" refers to a substance that behaves as an electrically conductive medium. For example, the electrolyte facilitates the mobilization of electrons and cations in a cell. Electrolytes may include mixtures of materials such as aqueous solutions of alkaline agents. Some electrolytes also comprise additives such as buffers. For example, an electrolyte may comprise a buffer comprising a borate or a phosphate. Example electrolytes include, without limitation, aqueous KOH, aqueous NaOH, or the liquid mixture of KOH, NaOH, or a combination thereof, including a polymer.

As used herein, "polymer" refers to a molecule composed of repeating structural units, or monomers, connected by covalent chemical bonds. Examples of polymers include plastics and DNA. An example polymer may comprise a liquid physical state at room temperature and/or throughout the operational temperature range of the electrochemical device in which it is stored. Other example polymers include polyethylene oxides such as polyethylene glycol (PEG), polypropylene glycol, polybutylene glycol, alkyl-capped polyethylene glycol, alkyl-capped polypropylene glycol, alkyl-capped polybutylene glycol, or combinations thereof. Other polymers include polyacetylenes, polypyrroles, polythiophenes, polyanilines, polyfluorenes, poly-3-hexylthiophene, polynaphthalenes, poly-p-phenylene sulfide, poly-para-phenylene vinylenes, or combinations thereof. Still other example polymers may have molecular weights or mean molecular weights of about 10,000 amu or less, (e.g., less than about 9,500 amu, or from about 50 amu to about 10,000 amu).

A substituted polymer denotes one for which a substituent group, a methyl group, for example, replaces a hydrogen on the polymer backbone.

For convenience, the polymer name "polyethyleneglycol" and the corresponding initials "PEG" are used interchangeably as adjectives to distinguish polymers, solutions for preparing polymers, and polymer coatings. Use of these names and initials in no way implies the absence of other constituents. These adjectives also encompass substituted and copolymerized polymers.

For convenience, the polymer name "polyethylene oxide" and the corresponding initials "PEO" are used interchangeably as adjectives to distinguish polymers, solutions for preparing polymers, and polymer coatings. Use of these names and initials in no way implies the absence of other constituents. These adjectives also encompass substituted and copolymerized polymers.

For convenience, the polymer name "polyvinyl alcohol" and its corresponding initials "PVA" are used interchangeably as adjectives to distinguish polymers, solutions for preparing polymers, and polymer coatings. Use of these names and initials in no way implies the absence of other constituents. These adjectives also encompass substituted and copolymerized polymers.

As used herein, an "alkyl-capped polymer" refers to a polymer with alkyl groups at both termini of the polymer chain. Examples of alkyl-capped polymers include, but are not limited to, alkyl-capped polyethyleneglycol (PEG), alkyl-capped polypropylene glycol (PPG). Examples of alkyl-capped PEG include, for example, but not limited to, the structures encompassed within the definition of Formula (I), provided below, methyl-capped PEG (mPEG), ethyl-capped PEG (ePEG), propyl-capped PEG (pPEG). Unless specifically provided herein, an "alkyl-capped polymer" may include combinations of two or more species of alkyl-capped polymers with the same or different alkyl caps and/or with the same or different mean molecular weights.

As used herein, "zirconium oxide" encompasses any oxide of zirconium, including zirconium dioxide and yttria-stabilized zirconium oxide. The zirconium oxide powder is dispersed throughout the PE material so as to provide a substantially uniform silver complex and a uniform barrier to transport of silver ions. In several embodiments, the average particle size of the zirconium oxide powder is in the range from about 1 nm to about 5000 nm, e.g., from about 5 nm to about 100 nm.

As used herein, "alkaline agent" refers to a base or ionic salt of an alkali metal (e.g., a hydroxide of an alkali metal). Furthermore, an alkaline agent forms hydroxide ions when dissolved in water or other polar solvents. Example alkaline agents include without limitation LiOH, NaOH, KOH, CsOH, RbOH, or any combination thereof. Alkaline agents may optionally include other salts to modify their total ionic strength, for example KF or $Ca(OH)_2$.

For convenience, the polymer name "polyvinylidene fluoride" and its corresponding initials "PVDF" are used interchangeably as adjectives to distinguish polymers, solutions for preparing polymers, and polymer coatings. Use of these names and initials in no way implies the absence of other constituents. These adjectives also encompass substituted and copolymerized polymers. A substituted polymer denotes one for which a substituent group, a methyl group, for example, replaces a hydrogen on the polymer backbone. One example copolymer is PVDF-co-HFO, or polyvinylidene fluoride-co-hexafluoropropylene.

For convenience, the polymer name "polytetrafluoroethylene" and its corresponding initials "PTFE" are used interchangeably as adjectives to distinguish polymers, solutions for preparing polymers, and polymer coatings. Use of these names and initials in no way implies the absence of other constituents. These adjectives also encompass substituted and copolymerized polymers. A substituted polymer denotes one for which a substituent group, a methyl group, for example, replaces a hydrogen on the polymer backbone.

As used herein, "electrically conductive", "conductive", or "conductor" refers to materials that readily conduct electric current. Example conductors include metals such as Cu, Ag, Fe, Au, Pt, Sn, Pb, Al, oxides thereof, or combinations thereof. Other example conductors include polymers such as polyethylene oxides (e.g., polyethylene glycol, polypropylene glycol, polybutylene glycol, alkyl-capped polyethylene glycol, alkyl-capped polypropylene glycol, alkyl-capped polybutylene glycol, or combinations thereof).

As used herein, "cell" and "electrochemical cell" are used interchangeably to refer to an electrochemical cell that includes at least one anode, at least one cathode, and electrolyte.

As used herein, "miscible" refers to materials that may be combined or may dissolve into one another in many proportions without separating. For example, miscible materials may combine to form a uniform mixture when the mixture is subjected to temperatures in the range of operating or storage temperatures of an electrochemical cell (e.g., above at least −20° C.).

As used herein, "weight percent" and its abbreviation "wt %" are used interchangeably and refer to concentrations in mixtures or solutions. For instance, a two component mixture having a total weight (or mass) of 100 g, 10 g of component 1, and 90 g of component 2 has 10 wt % of component 1 and 90 wt % of component 2.

As used herein, an "alkyl" group refers to a saturated aliphatic hydrocarbon group containing 1-8 (e.g., 1-6 or 1-4) carbon atoms. An alkyl group may be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group may be substituted (i.e., optionally substituted) with one or more substituents.

When describing polymers, the term "$M_a$" is used interchangeably with "mean molecular weight".

The symbol "$\underline{M}$" denotes molar concentration.

As used herein, "Ah" refers to Ampere (Amp) Hour and is a scientific unit for the capacity of a battery or electrochemical cell. A derivative unit, "mAh" represents a milliamp hour and is 1/1000 of an Ah.

As used herein, the terms "silver material" or "silver powder" refer to any silver compound such as Ag, AgO, $Ag_2O$, $Ag_2O_3$, $Ag_3O_4$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, $FeO_3$, $Ag_2FeO_3$, $Ag_4FeO_4$, any hydrate thereof, or any combination thereof. Note that 'hydrates' of silver include hydroxides of silver. Because it is believed that the coordination sphere surrounding a silver atom is dynamic during charging and discharging of the cell wherein the silver serves as a cathode, or when the oxidation state of the silver atom is in a state of flux, it is intended that the term 'silver powder' or 'silver material' encompass any of these silver oxides and hydrates (e.g., hydroxides). Terms 'silver powder' or 'silver material' also includes any of the abovementioned species that are doped and/or coated with dopants and/or coatings that enhance one or more properties of the silver. Example dopants and coatings are provided below. Note that the term "oxide" used herein does not, in each instance, describe the number of oxygen atoms present in the silver or silver material. One generic formula for silver oxide is $AgO_x(OH)_y(H_2O)_z$, wherein x, y, and z are positive real numbers or zero, and at least one of x, y, or z is 1. In other examples, a silver oxide may have a chemical formula of AgO, $Ag_2O_3$, or a combination thereof. Furthermore, silver may comprise a bulk material or silver may comprise a powder having any suitable mean particle diameter.

As used herein, "maximum voltage" or "rated voltage" refers to the maximum voltage an electrochemical cell may be charged without interfering with the cell's intended utility. For example, in several zinc-silver electrochemical cells that are useful in portable electronic devices, the maximum voltage is less than about 3.0 V (e.g., less than about 2.8 V, less than about 2.5 V, about 2.3 V or less, or about 2.0 V). In other batteries, such as lithium ion batteries that are useful in portable electronic devices, the maximum voltage is less than about 15.0 V (e.g., less than about 13.0 V, or about 12.6 V or less). The maximum voltage for a battery may vary depending on the number of charge cycles constituting the battery's useful life, the shelf-life of the battery, the power demands of the battery, the configuration of the electrodes in the battery, and the amount of active materials used in the battery.

As used herein, "charge profile" refers to a graph of an electrochemical cell's voltage or capacity with time. A charge profile may be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary or rechargeable cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include AgO, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof.

As used herein, the term "oxide" applied to alkaline batteries and alkaline battery electrodes encompasses corresponding "hydroxide" species, which are typically present, at least under some conditions.

As used herein, "silver oxide" refers to a silver complex or molecular species such as one having the chemical formula Ag, AgO, $Ag_2O$, $Ag_2O_3$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, combinations thereof, or the like.

Batteries and battery electrodes are denoted with respect to the active materials in the fully-charged state. For example, a zinc-silver oxide battery comprises an anode comprising zinc and a cathode comprising silver oxide. Nonetheless, more than one species is present at a battery electrode under most conditions. For example, a zinc electrode generally comprises zinc metal and zinc oxide (except when fully charged), and a silver oxide electrode usually comprises silver oxide (AgO and/or $Ag_2O$) and silver metal (except when fully discharged).

Cathodes and anodes may have many configurations. For example, an anode may be configured from a conductive mesh or grid that is coated with one or more anode materials. In another example, an anode may be a solid sheet or bar of anode material. Similarly, a cathode may be configured from a conductive mesh that is coated with one or more cathode materials, for example. In another example, a cathode may be a solid sheet or bar of cathode material.

Cathodes and/or anodes may also be comprised of particulate, powder material. As used herein, the term, "powder" refers to a dry, bulk solid composed of a plurality of fine particles that may flow freely when shaken or tilted. Properties of the powder may differ if compressed and/or wetted, for example, when used in a electrode in an electrochemical cell. Particles in a powder may comprise the same or different substances. Particles in a powder may all be approximately the same size ("homogenously sized powders") or of different sizes ("heterogeneously sized powders").

As used herein, the term, "diameter" or "particle diameter" refers to the diameter of longest axis of a particle. "Mean diameter" or 'mean particle diameter" refers to the average diameter in a sample or population of particles.

As used herein, a "dopant" or "doping agent" refers to a chemical compound that is added to a substance in low concentrations in order to alter the optical/electrical properties of the semiconductor. For example, a dopant may be added to the powder active material of a cathode to improve its electronic properties (e.g., reduce its impedance and/or resistivity or improve a cell's cycle life where the cathode is employed in said cell). In other examples, doping occurs when one or more atoms of a crystal lattice of a bulk material is substituted with one or more atoms of a dopant.

As used herein "substantially stable" or "substantially inert" refers to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, a "stabilizing agent" is an additive to anode or cathode that imparts increased Coulombic efficiency and/or constant capacity over an increased number of cycles over electrodes without a stabilizing agent. Coulombic efficiency is a measure of the difference between the power input to charge an electrochemical cell and the total power output available during discharge.

As used herein, a "binder" refers to a material that when combined with other materials may form a composite material. Example binders include polymers such as PTFE, PVDF, or copolymers thereof.

As used herein, the term "cathode active material" refers to a composition that includes silver, as described above (e.g., doped silver, coated silver, silver that is doped or coated, or any combination thereof), and one or more stabilizing agents. A cathode active material may optionally contain a binder.

As used herein, "cycle life" is the maximum number of times a secondary battery may be charged and discharged.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, an "electronic device" is any device that is powered by electricity. For example, and electronic device may include a portable computer, a portable music player, a cellular phone, a portable video player, or any device that combines the operational features thereof.

As used herein, an "audio device" is an electronic device that may generate sound waves. For example, a music device (e.g., a stereo or digital music player), a portable audio alarm, a microphone, a radio (e.g., walkie talkie), or a cellular telephone.

As used herein, a "video device" is an electronic device that may generate video, such as a television, a computer and/or computer monitor, or a PDA.

It is noted that certain electronic devices are categorized as both audio devices and video devices. For example, televisions, computers, and some music players and cellular telephones may generate both sound waves and video.

As used herein, an "electrochemical device" is any device that has at least one electrochemical cell. Examples of electrochemical devices include, without limitation, batteries (e.g., rechargeable batteries), fuel cells, electrolysis and/or electroplating cells, and the like.

II. ELECTROLYTES

One aspect of the present invention provides an electrolyte comprising alkyl-capped PEG; an alkaline agent; and water, wherein the electrolyte comprises at least about 60 wt % (from about 60 wt % to about 90 wt %, from about 62 wt % to about 80 wt %, or from about 63 wt % to about 67 wt %) water by weight of the electrolyte.

Alkyl-capped PEG polymers useful in electrolytes of the present invention include PEG polymers wherein both ends of the polymer backbone are terminated by alkyl moieties. In some embodiments, the alkyl-capped PEG comprises a polymer of formula (I):

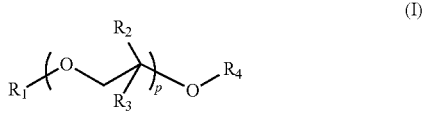

wherein each of $R_2$ and $R_3$ is independently $-(V_1-Q_1)_n-H$, wherein each $V_1$ is independently a bond or $-O-$, each $Q_1$ is independently a bond or a $C_{1-6}$ alkylidene, and each n is independently 1-5; each of $R_1$ and $R_4$ is independently $-Q_2-H$, wherein each $Q_2$ is an $C_{1-6}$ alkylidene; and p is a positive integer of sufficient value such that the polymer of formula (I) has a mean molecular weight of from about 50 amu to about 10,000 amu (e.g., less than about 5000 amu, less than about 3000 amu, from about 50 amu to about 2000 amu, or from about 100 amu to about 1000 amu). In other embodiments, the alkyl-capped PEG has a mean molecular weight of from about 250 amu to about 2000 amu (e.g., about 1000 amu). In several examples, the alkyl-capped PEG has a mean molecular weight of from about 50 amu to about 10,000 amu (e.g., less than about 5000 amu, less than about 3000 amu, from about 50 amu to about 2000 amu, or from about 100 amu to about 1000 amu).

In some embodiments, the alkyl-capped PEG comprises a polymer of formula (II):

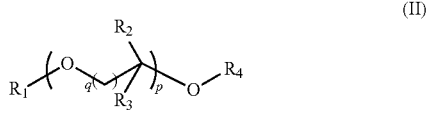

wherein each of $R_2$ and $R_3$ is independently $-(V_1-Q_1)_n-H$, wherein each $V_1$ is independently a bond or $-O-$, each $Q_1$ is independently a bond or a $C_{1-6}$ alkylidene, and each n is independently 1-5; each of $R_1$ and $R_4$ is independently $-Q_2-H$, wherein each $Q_2$ is an $C_{1-6}$ alkylidene; q is 0-2, and p is a positive integer of sufficient value such that the polymer of formula (I) has a mean molecular weight of from about 50 amu to about 10,000 amu (e.g., less than about 5000 amu, less than about 3000 amu, from about 50 amu to about 2000 amu, or from about 100 amu to about 1000 amu). In other embodiments, the alkyl-capped PEG has a mean molecular weight of from about 250 amu to about 2000 amu (e.g., about 1000 amu). In several examples, the alkyl-capped PEG has a mean molecular weight of from about 50 amu to about 10,000 amu (e.g., less than about 5000 amu, less than about 3000 amu, from about 50 amu to about 2000 amu, or from about 100 amu to about 1000 amu).

In some embodiments, the alkyl-capped PEG is at least substantially miscible when mixed with the alkaline agent and water. For example, the alkyl-capped PEG is at least substantially miscible when mixed with the alkaline agent and water over a range of temperatures that at least includes the operating and/or storage temperatures of the electrochemical cell in which the mixture is used. For instance, the alkyl-capped PEG is at least substantially miscible when mixed with the alkaline agent and water at a temperature of about −20° C. or greater (e.g., about −10° C.).

In some embodiments, the alkyl-capped PEG has a glass transition temperature of about +40° C. or less. In other embodiments, the alkyl-capped PEG has a glass transition temperature of about −20° C. or less.

And, in some embodiments, the electrolyte comprises 5 wt % or less (e.g., less than 2.5 wt % or less than 1 wt % (e.g., from about 0.05 wt % to about 0.75 wt % or from about 0.1 wt % to about 0.5 wt %) of alkyl-capped PEG by weight of the electrolyte.

The electrolyte of the present invention also comprises an alkaline agent. Suitable alkaline agents include, without limitation, hydroxides of alkali metals and any combinations thereof. Additional alkaline agents useful in the electrolyte of the present invention are capable of producing hydroxyl ions when mixed with an aqueous or polar solvent such as water and/or a liquid polymer. In some examples, the alkaline agent comprises LiOH, NaOH, KOH, CsOH, RbOH, or any combination thereof. In other examples, the alkaline agent comprises LiOH, NaOH, KOH, or any combination thereof. For instance, the alkaline agent comprises KOH. And, in one example, the alkaline agent comprises a mixture of KOH and NaOH.

In some embodiments, the electrolyte comprises less than 40 wt % (e.g., from about 30 wt % to about 39.9 wt %) of the alkaline agent by weight of the electrolyte. For example, the electrolyte comprises less than 40 wt % KOH by weight of the electrolyte. In other examples, the electrolyte comprises 35 wt % or less of KOH by weight of the electrolyte.

In some embodiments, the alkaline agent comprises about 60 wt % or greater (e.g., from about 65 wt % to about 99 wt %) of KOH by weight of the alkaline agent. In other embodiments, the alkaline agent comprises KOH and NaOH. For example, the alkaline agent comprises 60 wt % or greater (e.g., from about 65 wt % to about 99 wt %) of KOH by weight of the alkaline agent and 40 wt % or less (e.g., from about 1 wt % to about 35 wt %) of NaOH by weight of the alkaline agent. In another example, the alkaline agent comprises a ratio of from about 60 wt % KOH:40 wt % NaOH to about 90 wt % KOH:10 wt % NaOH by weight of the alkaline agent. For example, the alkaline agent comprises a ratio of about 80 wt % KOH:20 wt % NaOH by weight of the alkaline agent.

Electrolytes of the present invention may optionally comprise additional agents such as stabilizing agents (e.g., sodium tetraborate or hydrates thereof), wetting agents, or any combination thereof.

In some embodiments, the electrolyte comprises sodium tetraborate. For example, the electrolyte comprises less than about 10 wt % (e.g., from about 1 wt % to about 8 wt %) of sodium tetraborate by weight of the electrolyte.

And, in some embodiments, the electrolyte comprises a wetting agent. Without limitation, some wetting agents useful in electrolytes of the present invention include those wetting agents that improve the ability of cellulose to absorb electrolytes of the present invention. In some instances, the wetting agent includes a small carbon chain alcohol.

In alternative embodiments, the electrolyte comprises a small carbon chain alcohol. For example, the electrolyte comprises a $C_{1-8}$ alcohol. In some examples, the $C_{1-8}$ alcohol is substantially miscible with the alkyl-capped PEG. For instance, the electrolyte comprises less than about 10 wt % (e.g., less than about 5 wt % or less than about 1 wt %) of a small carbon chain alcohol (e.g., methanol, ethanol, isopropanol, butanol, or any combination thereof) by weight of electrolyte.

Electrolytes of the present invention are useful in many electrochemical devices such as those of the present invention (e.g., zinc-silver batteries).

III. ELECTROCHEMICAL CELLS

Another aspect of the present invention provides an electrochemical cell comprising an anode comprising Zn, a cathode comprising a silver material, a separator comprising cellulose, and any of the electrolytes described above.

A schematic diagram of a zinc-silver electrochemical cell according to the present invention is given in FIG. 1. An electrochemical cell may comprise one or more anodes, one or more cathodes, and one or more cellulose separator layers between the one or more anodes and one or more cathodes. The anode and/or cathode may optionally comprise a polymer wrap or bag that protects the electrodes and/or maintains the integrity and shape of electrodes; especially, when the electrodes comprise powdered or pliable materials. In addition to the cellulose separator, other separators may be provided that may comprise cellulose or different types of polymeric materials such as PEO or PVA, for example. The separators, anodes, and cathodes may be soaked in electrolyte (not shown) prior to assembly into a cell. As seen in the example cell depicted in FIG. 1, the electrodes, separators and electrolyte may be enclosed in a preformed bag material, or other kind of cell housing.

Example electrochemical cells of the present invention are described more fully below.

A. Electrodes

1. Cathodes

Cathodes useful in electrochemical cells of the present invention comprise silver material (e.g., Ag, AgO, $Ag_2O$, $Ag_2O_3$, AgOH, AgOOH, AgONa, AgOK, AgOLi, AgORb, AgOONa, AgOOK, AgOOLi, AgOORb, $AgCuO_2$, $AgFeO_2$, $AgMnO_2$, $Ag(OH)_2$, or any combination thereof). In some embodiments, the cathode comprises AgO, $Ag_2O_3$, or any combination thereof.

Cathodes of electrochemical cells of the present invention may optionally include additives such as a stabilizing agent, a binder, a current collector, dopants, coatings, combinations thereof, or the like.

In some embodiments, the cathode material comprises a silver material, and the silver material comprises a powder. In some embodiments, the powder comprises a stabilizing agent. The stabilizing agent may comprise a plurality of particles having a mean particle diameter of 100 nm or less, wherein the stabilizing agent is present in an amount sufficient to impart the cathode with a Coulombic efficacy of greater than about 98%.

Cathodes of the present invention may include any suitable stabilizing agent. For instance, the stabilizing agent may comprise a p-type semiconductor, an n-type semiconductor, or a combination thereof. Or, the stabilizing agent comprises a plurality of particles comprising ZnO, $SiO_2$, $ZrO_2$, $TiO_2$, $Al_2O_3$, MgO, SiC, $In_2O_3$, $Ho_2O_3$, MgO, $ZnTiO_3$, $B_2O_3$, $LiAlO_2$, $BaTiO_3$, $Li_{4-x}Ca_xSiO_4$, $Li_{4-x}Mg_x$-$SiO_4$, Ultramarine, or any combination thereof. In some embodiments, the stabilizing agent is in the form of a powder comprising particles having a mean size of 100 nm or less.

For example, in several embodiments, the stabilizing agent comprises ZnO. In other embodiments, the stabilizing agent comprises $ZrO_2$. In still other embodiments, the stabilizing agent comprises $SiO_2$. In several embodiments, the stabilizing agent comprises a plurality of particles and each of the particles comprises $SiO_2$, $ZrO_2$, or ZnO. In some instances, the stabilizing agent comprises a plurality of particles comprising a combination of $SiO_2$ particles, $ZrO_2$ particles, and ZnO particles.

Also, the stabilizing agent may be present in any suitable amount. For instance, the stabilizing agent is present in an amount of about 7 wt % or less (e.g., about 5 wt % or less, about 1.5 wt % or less, or about 0.5 wt % or less (e.g., about 0.45 wt % or less, about 0.30 wt % or less, about 0.20 wt % or less, or about 0.15 wt % or less) by weight of the cathode material. In other instances, the stabilizing agent is present in an amount of from about 0.01 wt % to about 0.2 wt % by weight of the cathode material.

In some embodiments, the stabilizing agent may be may be doped and/or coated with any suitable additive. In embodiments with particulate stabilizing agents, the stabilizing agent particles may be doped and/or coated.

For example, the stabilizing agent comprises ZnO that is doped with $Al_2O_3$. For example, the ZnO particles are doped with from about 1 wt % to about 10 wt % of $Al_2O_3$ by weight of the doped ZnO particles.

Also, cathodes of the present invention may include silver that is doped or coated. For example, the silver is doped with a doping agent comprising Pb, B, Al, Ga, Zn, Ni, Pd, In, V, Nb, T, oxides thereof, or any combination thereof. Or, the silver is coated with a coating agent comprising Pb, B, Al, Ga, Zn, Ni, Pd, In, V, Nb, T, Fe, W, Ru, Mn, Mo oxides thereof, or any combination thereof. In some embodiments, the dopant is present in a concentration of from about 0.25 mol % to about 10 mol %. The doped and/or coated silver may be in particulate form or solid form or a combination thereof.

In some embodiments, the cathode may comprise a binder. In one example, the binder of the anode or the cathode comprises PTFE, PVDF, or any copolymer thereof.

2. Anodes

Anodes useful in electrochemical cells of the present invention comprise Zn. Anodes may optionally include additives or components such as a stabilizing agent, a binder, a current collector, dopants, coatings, combinations thereof, or the like. In some instances, the anode comprises a binder. For example, the anode comprises a binder, and the anode binder comprises the same material comprising the cathode binder. In other examples, the anode binder comprises different material than that comprising the cathode binder. In one example, the binder of the anode or the cathode comprises PTFE, PVDF, or any copolymer thereof.

B. Separators

Electrochemical cells of the present invention additionally comprise one or more separators that separate the anode from the cathode and/or their reaction products. Separators useful in the present invention comprise cellulose.

1. Cellulose Separators

Production of cellulose separators may be effected by any one of several methods known in the art. Example production methods are provided in more detail below.

Commercially available cellulose separator films may also be used. Suitable commercial cellulose separator membranes include Cellophane™ films (Innovia, Georgia, USA).

The cellulose separator films may be treated with inorganic salts to retard silver deposition on the membrane. Suitable inorganic salts include, for example, fluoride salts, such as $CaF_2$.

The cellulose separator may optionally contain hydrogen-permeable domains within the cellulose film to reduce gas buildup in the cell. The hydrogen permeable domain material is preferably soluble in a common solvent to cellulose so that the domains form on casting. Suitable hydrogen permeable materials are cellulose ethers in which the ether group contains 2 to 8 carbon atoms and is present in the separator film in an amount from 10 to 60 parts by weight to 100 parts of cellulose.

It is noted that separators useful in electrochemical cells may be configured in any suitable way such that the separator is substantially inert in the presence of the anode, cathode, and electrolyte of the electrochemical cell. For example, a separator for a rectangular battery electrode may be in the form of a sheet or film comparable in size or slightly larger than the electrode, and may simply be placed on the electrode or may be sealed around the edges. The edges of the separator may be sealed to the electrode, an electrode current collector, a battery case, or another separator sheet or film on the backside of the electrode via an adhesive sealant, a gasket, or fusion (heat sealing) of the separator or another material. The separator may also be in the form of a sheet or film wrapped and folded around the electrode to form a single layer (front and back), an overlapping layer, or multiple layers. For a cylindrical battery, the separator may be spirally wound with the electrodes in a jelly-roll configuration. Typically, the separator is included in an electrode stack comprising a plurality of separators. The oxidation-resistant separator of the invention may be incorporated in a battery in any suitable configuration.

In several embodiments, separators of the present invention may comprise a film having a single layer or a plurality of layers, wherein the plurality of layers may comprise a single cellulose polymer (or copolymer) or more than one polymer (or copolymer) of the same or different composition.

In several embodiments, the separators comprise a unitary structure formed from at least two strata. The separator may include strata wherein each layer comprises the same material, or each layer comprises a different layer, or the strata are layered to provide layers of the same material and at least one layer of another material. In several embodiments, one stratum comprises an oxidation resistant material, and the remaining stratum comprises a dendrite resistant material. In other embodiments, at least one stratum comprises an oxidation-resistant material, or at least one stratum comprises a dendrite-resistant material. The unitary structure is formed when the material comprising one stratum (e.g., an oxidation-resistant material) is coextruded with the material comprising another stratum (e.g., a dendrite resistant material or oxidation-resistant material). In several embodiments, the unitary separator is formed from the coextrusion of oxidation-resistant material with dendrite-resistant material.

Other polymeric separator materials which may be present in an electrochemical cell of the present invention are detailed below.

2. Polyether Polymer Material

In several embodiments of the present invention the oxidation-resistant stratum of the separator comprises a polyether polymer material that is coextruded with a dendrite-resistant material. The polyether material may comprise polyethylene oxide (PEO) or polypropylene oxide (PPO), or a copolymer or a mixture thereof. The polyether material may also be copolymerized or mixed with one or more other polymer materials, polyethylene, polypropylene and/or polytetrafluoroethylene (PTFE), for example. In some embodiments, the PE material is capable of forming a free-standing polyether film when extruded alone, or may form a free standing film when coextruded with a dendrite-resistant material. Furthermore, the polyether material is substantially inert in the alkaline battery electrolyte and in the presence of silver ions.

In alternative embodiments, the oxidation resistant material comprises a PE mixture that optionally includes zirconium oxide powder. Without intending to be limited by theory, it is theorized that the zirconium oxide powder inhibits silver ion transport by forming a surface complex with silver ions.

In other embodiments, the oxidation-resistant material further comprises an optional conductivity enhancer. The conductivity enhancer may comprise an inorganic compound, potassium titanate, for example, or an organic material. Titanates of other alkali metals than potassium may be used. Suitable organic conductivity enhancing materials include organic sulfonates and carboxylates. Such organic compounds of sulfonic and carboxylic acids, which may be used singly or in combination, comprise a wide range of polymer materials that may include salts formed with a wide variety of electropositive cations, $K^+$, $Na^+$, $Li^+$, $Pb^{+2}$, $NH^+$, $Ba^{+2}$, $Sr^{+2}$, $Mg^{+2}$, $Ca^{+2}$ or anilinium, for example. These compounds also include commercial perfluorinated sulfonic acid polymer materials, Nafion® and Flemion®, for example. The conductivity enhancer may include a sulfonate or carboxylate copolymer, with polyvinyl alcohol, for example, or a polymer having a 2-acrylamido-2-methyl propanyl as a functional group. A combination of one or more conductivity enhancing materials may be used.

Oxidation-resistant material that is coextruded to form a separator of the present invention may comprise from about 5 wt % to about 95 wt % (e.g., from about 20 wt % to about 60 wt %, or from about 30 wt % to about 50 wt %) of zirconium oxide and/or conductivity enhancer.

Oxidation-resistant materials may also comprise additives such as surfactants that improve dispersion of the zirconium oxide powder by preventing agglomeration of small particles. Any suitable surfactant may be used, including one or more anionic, cationic, non-ionic, ampholytic, amphoteric and zwitterionic surfactants, and mixtures thereof. In one embodiment, the separator comprises an anionic surfactant. For example, the separator comprises an anionic surfactant, and the anionic surfactant comprises a salt of sulfate, a salt of sulfonate, a salt of carboxylate, or a salt of sarcosinate. One useful surfactant comprises p-(1,1,3,3-tetramethylbutyl)-phenyl ether, which is commercially available under the trade name Triton X-100 from Rohm and Haas.

In several embodiments, the oxidation-resistant material comprises from about 0.01 wt % to about 1 wt % of surfactant.

3. Polyvinyl Polymer Material

In several embodiments of the present invention the dendrite-resistant stratum of the separator comprises a polyvinyl polymer material that is coextruded with the oxidation-resistant material. In several embodiments, the PVA material comprises a cross-linked polyvinyl alcohol polymer and a cross-linking agent.

In several embodiments, the cross-linked polyvinyl alcohol polymer is a copolymer. For example, the cross-linked PVA polymer is a copolymer comprising a first monomer, PVA, and a second monomer. In some instances, the PVA polymer is a copolymer comprising at least 60 mole percent of PVA and a second monomer. In other examples, the second monomer comprises vinyl acetate, ethylene, vinyl butyral, or any combination thereof.

PVA materials useful in separators of the present invention also comprise a cross-linking agent in a sufficient quantity as to render the separator substantially insoluble in water. In several embodiments, the cross-linking agent used in the separators of the present invention comprises a monoaldehyde (e.g., formaldehyde or glyoxilic acid); aliphatic, furyl or aryl dialdehydes (e.g., glutaraldehyde, 2,6 furyldialdehyde or terephthaldehyde); dicarboxylic acids (e.g., oxalic acid or succinic acid); polyisocyanates; methylolmelamine; copolymers of styrene and maleic anhydride; germaic acid and its salts; boron compounds (e.g., boron oxide, boric acid or its salts; or metaboric acid or its salts); or salts of copper, zinc, aluminum or titanium. For example, the cross-linking agent comprises boric acid.

In another embodiment, the PVA material optionally comprises zirconium oxide powder. In several embodiments, the PVA material comprises from about 1 wt % to about 99 wt % (e.g., from about 2 wt % to about 98 wt %, from about 20 wt % to about 60 wt %, or from about 30 wt % to about 50 wt %).

In many embodiments, the dendrite-resistant strata of the separator of the present invention comprise a reduced ionic conductivity. For example, in several embodiments, the separator comprises an ionic resistance of less than about 20 mΩ/cm$^2$, (e.g., less than about 10 mΩ/cm$^2$, less than about 5 mΩ/cm$^2$, or less than about 4 mΩ/cm$^2$).

The PVA material that forms the dendrite-resistant stratum of the separator of the present invention may optionally comprise any suitable additives such as a conductivity enhancer, a surfactant, a plasticizer, or the like.

In some embodiments, the PVA material further comprises a conductivity enhancer. For example, the PVA material comprises a cross-linked polyvinyl alcohol polymer, a zirconium oxide powder, and a conductivity enhancer. The conductivity enhancer comprises a copolymer of polyvinyl alcohol and a hydroxyl-conducting polymer. Suitable hydroxyl-conducting polymers have functional groups that facilitate migration of hydroxyl ions. In some examples, the hydroxyl-conducting polymer comprises polyacrylate, polylactone, polysulfonate, polycarboxylate, polysulfate, polysarconate, polyamide, polyamidosulfonate, or any combination thereof. A solution containing a copolymer of a polyvinyl alcohol and a polylactone is sold commercially under the trade name Vytek® polymer by Celanese, Inc. In several examples, the separator comprises from about 1 wt % to about 10 wt % of conductivity enhancer.

In other embodiments, the PVA material further comprises a surfactant. For example, the separator comprises a cross-linked polyvinyl alcohol polymer, a zirconium oxide powder, and a surfactant. The surfactant comprises one or more surfactants selected from an anionic surfactant, a cationic surfactant, a nonionic surfactant, an ampholytic surfactant, an amphoteric surfactant, and a zwitterionic surfactant. Such surfactants are commercially available. In several examples, the PVA material comprises from about 0.01 wt % to about 1 wt % of surfactant.

In several embodiments, the dendrite-resistant stratum further comprises a plasticizer. For example, the dendrite-resistant stratum comprises a cross-linked polyvinyl alcohol polymer, a zirconium oxide powder, and a plasticizer. The plasticizer comprises one or more plasticizers selected from glycerin, low-molecular-weight polyethylene glycols, aminoalcohols, polypropylene glycols, 1,3 pentanediol branched analogs, 1,3 pentanediol, and/or water. For example, the plasticizer comprises greater than about 1 wt % of glycerin, low-molecular-weight polyethylene glycols, aminoalcohols, polypropylene glycols, 1,3 pentanediol branched analogs, 1,3 pentanediol, or any combination thereof, and less than about 99 wt % of water. In other examples, the plasticizer comprises from about 1 wt % to about 10 wt % of glycerin, low-molecular-weight polyethylene glycols, aminoalcohols, polypropylene glycols, 1,3 pentanediol branched analogs, 1,3 pentanediol, or any combination thereof, and from about 99 wt % to about 90 wt % of water.

In some embodiments, the separator of the present invention further comprises a plasticizer. In other examples, the plasticizer comprises glycerin, a low-molecular-weight polyethylene glycol, an aminoalcohol, a polypropylene glycols, a 1,3 pentanediol branched analog, 1,3 pentanediol, or combinations thereof, and/or water.

Separators useful for the present invention may comprise a unitary structure that includes a plurality of layers. Some of these layers may comprise PEO material, as described above, and several of these may comprise PVA material, as described above, and some unitary structures may comprise both materials. Sometimes the PVA material and the PEO material are coextruded, e.g., using a slotted die or other apparatus, into a free standing separator or are coextruded onto a substrate, e.g., a commercially available substrate such as Solupor, Scimat, or the like, to form a supported separator.

C. Electrolytes

In electrochemical cells of the present disclosure, embodiments of the electrolytes as described above may be used maintain and improve cellulose separator plasticity while operating and storing the cell.

D. Cell Housing

Cells of the present invention may include any suitable housing such that the housing does not substantially impede electrical access to the terminals of the cell.

In some embodiments, the cell housing comprises flexible packaging material. Usually, the flexible packaging material is used in a sachet configuration or a drawn cavity configuration. Unlike traditional applications, flexible battery packaging requires feed through to carry the current from the enclosed electrochemical cell. Insulating and sealing these feed-throughs may be done by a number of methods. Typically, the flexible packaging material consists of three functional layers, which may be embodied in three physical layer or less (e.g., in some packaging materials, the physical layers perform one, two, or three of the functions performed by functional layers).

The first functional layer is an electrolyte compatible layer. This layer provides chemical resistance and physical containment of the liquid or gelatinous electrolyte. Typically this layer may consist of a polyolefin or polyethylvinyl alcohol that may be coextruded or mixed with an adhesion promoter, ethyl acrylic acid for example, to facilitate heat sealing or current feed-through adhesion. The second functional layer is a vapor barrier layer. This layer may be a metal, aluminum, or a low transmissibility polymer. This functional layer needs to retard the diffusion of water, electrolyte solvent, oxygen, hydrogen, and carbon dioxide into the cell. The third functional layer, provide a physical integrity layer on the outside of the packaging. It provides much of the packaging materials strength and abrasion resistance. This layer may also provide the physical strength to allow the packaging material to be formed into blisters. This layer is typically nylon or mylar in its composition. The functional layer materials may also be applied as conformal coatings to the cells by dip coating or spraying. Cells packaged in flexible packaging typically contain a reduced pressure atmosphere with the absolute pressure inside less than ambient pressure.

IV. METHODS

A. Producing Electrolytes

Another aspect of the present invention provides a method of producing an electrolyte comprising providing an alkyl-capped PEG; providing an alkaline agent, and providing water; and combining the polymer, the alkaline agent and the water to generate an electrolyte, wherein the electrolyte comprises 60 wt % or greater water by weight of the electrolyte. In some aspects, the alkyl-capped PEG comprises a polymer of formula (I), with a mean molecular weight of from about 100 amu to about 10,000 amu (e.g., from about 250 amu to about 2000 amu. In some methods, the alkyl-capped PEG comprises methyl-capped PEG (mPEG), ethyl-capped PEG (ePEG), propyl-capped PEG (pPEG), or any combination thereof.

In some methods, the alkyl-capped PEG has a glass transition state about −20° C. or less. Some methods further comprise providing sodium tetraborate such that the sodium tetraborate comprises about 0.1%wt to 5%wt by weight of the electrolyte.

In some embodiments, the method further comprises providing about 10 wt % or less by weight of electrolyte of a small carbon chain alcohol such as any of the small carbon chain alcohols described above.

Alkaline agents useful in the present methods include any polymers and alkaline agents described above, for example, but not limited to, LiOH, NaOH, KOH, CsOH, RbOH, or combinations thereof (e.g., NaOH, KOH, or a combination thereof). In some aspects of the method, the electrolyte comprises 5 wt % to about 45 wt % of alkaline agent by weight of the electrolyte, from about 30 wt % to about 40 wt % of alkaline agent by weight of the electrolyte.

B. Electrochemical Cells and Devices

Another aspect of the present invention provides methods of manufacturing an electrochemical cell comprising: providing an anode comprising zinc; providing cathode comprising a silver material; providing a separator comprising cellulose; and providing an electrolyte comprising an alkyl-capped PEG; an alkaline agent; and water, wherein the water is present in an amount greater than or equal to about 60 wt % of the electrolyte. Suitable electrolytes, cathode materials and separator materials may comprise any of those described herein.

C. Methods of Producing Cellulose Separators of the Present Invention

Other aspects of the present disclosure provide a method of producing a cellulose separator. In some aspects, the method comprises providing an alkyl-capped PEG; providing cellulose; and combining the cellulose with the alkyl-capped PEG.

The alkyl capped PEG may comprise a polymer of formula (I), with a total molecular weight of from about 100 amu to about 10,000 amu (e.g., about 250 amu, 100 amu, 250 amu or 100 amu, 250 amu and 1000 amu). In some aspects, the alkyl-capped PEG may be methyl-capped PEG.

In some embodiments, the alkyl-capped PEG may have a glass temperature state of about −20° C. or below. In some cases the alkyl-capped PEG may be fluid at room temperature, and be combined with the cellulose directly. In some aspects, the alkyl-capped PEG is provided in a mixture or solution. In preferred embodiments, the mixture or solution is a liquid at room temperature.

In some aspects, the alkyl-capped PEG is provided in a mixture comprising a small carbon-chain alcohol. Suitable small-chain alcohols include, for example, but not limited to, methanol, ethanol, isopropanol, and mixtures thereof.

Alkyl-capped PEG is present in the mixture with a small-chain alcohol, in some embodiments, in ratios of about 30 wt % to total weight of small-chain alcohol or less (e.g., 30 wt %, 20 wt %, 15 wt %, and 5 wt %). Alkyl-capped PEG may be substantially solid at room temperature (for example, but not limited to, methyl-capped PEG 1000), and combined with the small-chain alcohol in a powdered form, dissolved and/or mixed therein. In some embodiments, alkyl-capped PEG may be liquid at room temperature (for example, but not limited to methyl-capped PEG 250) and mixed with a small-chain alcohol to form a liquid mixture.

In some embodiments, mixtures of liquid and solid alkyl-capped PEG may be mixed with one or more small-chain liquid alcohols.

In other embodiments, the alkyl-capped PEG may be provided in a mixture comprising an alkaline agent. Suitable alkaline agents may be any of the agents specified above. In some embodiments, for example, the alkaline agent is aqueous KOH. In some embodiments the aqueous KOH is about 45% KOH or less (e.g., 45%, 40%, 35%, 30%, 25%) by weight of the alkaline agent. In some embodiments, the alkaline agent is a mixture of aqueous KOH and NaOH. In some embodiments, the ratio of KOH:NaOH is about 80 wt %:20 wt % of the total weight of the electrolyte. In other embodiments, the KOH:NaOH may be in a ratio of about 90:10, 80:20, 70:30, or 60:40 (w:w) of the total weight of the electrolyte. In other embodiments, the alkaline agent may comprise about 60% water (w:w) or less (e.g., such that the alkaline agent is about 40%, 36%, 32%, 28%, 24%, 20% of the weight of the total liquid).

Alkyl-capped PEG may be provided, in some embodiments, in ratios of about 15 wt % weight to total weight of alkaline agent or less (e.g., 15 wt %, 5 wt %, 2.5 wt %). Alkyl-capped PEG may be substantially solid at room temperature (for example, but not limited to, methyl-capped PEG 1000) and combined with an alkaline agent in a powdered form, and dissolved and/or mixed therein. In some embodiments, alkyl-capped PEG may be liquid at room temperature (for example, but not limited to methyl-capped PEG 250) and mixed with an alkaline agent to form a liquid mixture. In some aspects, the alkyl-capped PEG has a mean molecular mass of between about 200 and 1000 amu.

In other embodiments, an alkyl-capped PEG may be provided in a mixture of an alkaline agent and a small-chain alcohol.

In embodiments of the method, the mixture comprising an alkyl-capped PEG, an alkaline agent and/or an small chain alcohol may further comprise sodium tetraborate. In some embodiments, the sodium tetraborate may be present at about 10%wt or less of the total weight of the mixture (e.g., about 10%, 7.5%, 5%, 2.5%, 1%).

In some aspects of the method of producing a separator, the cellulose is provided in the form of a membrane. In some aspects, the separator may be an already-cast cellulose membrane. Cellulose membranes may be produced and cast using any methods widely known in the art. Commercially available cellulose separator films may also be used. Suitable commercial cellulose separator membranes may be Cellophane™ films (Innovia, Georgia, USA).

In some embodiments of the method, the cellulose membrane remains in contact with (e.g., soaking in) an alkyl-capped PEG or a liquid mixture comprising alkyl-capped PEG for 24 hours or less (e.g., 24 h, 18 h, 12 h, 6 h or less). After removal from the liquid, the cellulose separator may be allowed to completely dry prior to use in an electrochemical cell, or may be loaded into an electrochemical cell when wet or partially wet.

Other aspects of the present disclosure provide methods of mixing alkyl-capped MPEG and cellulose, wherein the cellulose is provided in solution or mixture. In preferred embodiments, the mixture or solution comprising cellulose is a fluid. In some embodiments, the alkyl-capped PEG and cellulose solution may be mixed prior to casting the separator. In other embodiments, the alkyl-capped PEG may be mixed with the separator just after casting (i.e., while the separator is still wet/not solidified).

Cellulose may be dissolved and prepared by any one of several methods well-known in the art. An example production method is effected as follows. A solution of cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC the applicable range is 3 to 8% weight LiCl to DMAC and the applicable range for the percent weight solution of cellulose to solvent is 1 to 11%. The dissolved cellulose may be crosslinked in a variety of ways, including reacting it with an alkyl dihalide.

Other suitable methods are creating a cellulose solution, or "viscose", by treating cellulose fibers dissolved in an alkaline agent (e.g., a high concentration of aqueous KOH and/or NaOH) with carbon disulphide to form cellulose xanthate.

To the cellulose solutions may be added alkyl-capped PEG, and thoroughly mixed. In other embodiments, the cellulose mixture is cast prior to the addition of alkyl-capped PEG.

The resulting mixture is then cast via conventional methods. These methods are known to those skilled in the art of membrane fabrication. They include extrusion of the solution onto a conveyor belt, casting onto a glass plate with a casting knife or casting onto a well-leveled glass plate.

After casting, the resulting solution is coagulated with conventional techniques, preferably using water as the coagulating agent. Coagulation may be attained either by exposure to ambient moisture or by direct application of a water stream to the resulting solution. The coagulated cellulose material is then washed to remove any remaining solvents and or salts (such as LiCl salt). For a washing fluid, it is possible to employ alcohols mixed with water, but it is preferable that they be kept below 50% volume ratio.

After thorough washing of the resulting gel, a liquid comprising alkyl-capped MPEG is added to the membrane in a final wash of the cellulose gel. The liquid may comprise, for example but not limited to, of a low-molecular weight alcohol, such as isopropanol. Alkyl-capped PEG may comprise, in some embodiments of the liquid wash, in ratios of about 30 wt % to total weight of small-chain alcohol or less (e.g., 30%, 20%, 15%, 5%). The gel may then be dried by any conventional methods, including air-drying, press-drying, or vacuum-drying.

V. EXAMPLES

It is noted that the examples provided below are exemplary in nature and do not encompass the entire scope of the present invention. Materials used for the preparation of example electrolytes, cells, and separators of the present invention may, in many cases, include substitutions.

Example 1

Electrolyte A

An electrolyte was formulated according to Table 1:

TABLE 1

Formulation for example electrolyte.

| Ingredient | Amount (g) |
|---|---|
| Solution 1 | 110 |
| methyl-capped PEG (1000) | 5.5 |

Solution 1: 502.86 g KOH, 125.72 g NaOH, and 1335.72 g $dH_2O$ was mixed, under stirring, to generate a solution of 32% (80% KOH:20% NaOH) (1964.3 g). To this solution, 98.22 g of sodium tetraborate was added under stirring to generate Solution 1.

Example 2

Electrolyte B

Under stirring, 5.0 g of methyl-capped PEG (1000) was added to 110 g of aqueous KOH (40% conc.). Electrolyte B is useful in methods of producing cellulose separators.

Example 3

Methods of Preparing Cellulose Separators

The following alkyl-capped PAO mixtures were prepared and added to Innovia cellulose films:

1) 5.5 g of powdered methyl-capped PEG (1000) was dissolved in 48.0 g of isopropanol, to which 2.5 g of liquid methyl-capped PEG was added.

2) 5.5 g of powdered methyl-capped PEG (1000) was dissolved in 48.0 g of isopropanol, to which 5.5 g of liquid methyl-capped PEG was added.

3) 5.5 g of powdered methyl-capped PEG (1000) was dissolved in 48.0 g of isopropanol, to which 10.0 g of liquid methyl-capped PEG was added.

4) Liquid methyl-capped PEG (250).

Example 4

Methods of Formulating Cathodes for Use in Example Electrochemical Cells

Materials:
Silver nitrate: A.C.S. grade, DFG
Potassium hydroxide solution: 40% KOH solution, prepared from KOH pellets,
Potassium persulfate, 99+%, Sigma-Aldrich
Zinc oxide: doped with 6% Al, nanopowder, <50 nm (BET), >97%, Sigma-Aldrich
Zirconium(IV) oxide: nanopowder, <100 nm particle size (BET), Sigma-Aldrich
Silica: nanopowder, <5 nm, Nyacol Nano Technologies Inc.

Materials used for the preparation of cathodes of the present invention may, in many cases, include substitutions. For instance, a KOH alkaline solution may be substituted with NaOH, LiOH, CsOH, combinations thereof, or the like. And the oxidizer $K_2S_2O_8$ and also be substituted with $Na_2S_2O_8$ or other oxidizing agents. Other substitutions are also possible. For instance, gelatin may be replaced by another surfactant. Also, in many instances nanopowders comprising stabilizing agents may be used interchangeably or in any suitable combination.

4.1 Production of Silver Oxide Cathode

A 2000 ml beaker is placed into a hot water bath and an overhead stirring propeller is installed. Next, 116.7 g of $AgNO_3$ and 1000 g of DI water were added to the reaction container and stirred at 400 rpm. Next, 0.11 g gelatin was added. The flask was heated to 55° C.

In a plastic container, 260 g of KOH solution (1.4 g/ml) was mixed with 260 g of DI water to produce a diluted KOH solution. The diluted KOH solution was added to the heated reaction container per precise pump. Next, 198 g of potassium persulfate was added at 65° C. After the addition of the potassium persulfate, the reaction flask was maintained at 65° C. for 50 min.

The stirring was stopped and the AgO particles settled to the bottom of the flask. The water was demayted. The particles were rinsed with DI water, and when the particles settled the water was demayted again. The rinse and demayt process was repeated until the ion conductivity of the mixture dropped below 20 micro-Ohms. The slurry was filtered and dried at 60° C. in a vacuum oven.

This process generated ~85 g of AgO (yield >99%).

In a 2 L Erlenmeyer flask, 70 g of dry AgO powder, produced using the method above, was added to 700 g of DI water. The mixture was stirred with an overhead stirrer at a stir speed of 250 rpm. Next, 2.73 g of lead acetate trihydrate was dissolved in 50 g of DI water and added dropwise to the AgO mixture with a MasterFlex pump. Once the addition was completed, the lead solution container was rinsed with 50 g DI water twice and the dropwise addition continued.

Sixty minutes after the lead acetate addition, stirring was stopped, the AgO particles settled, and the water was demayted. This rinse and demayt procedure was repeated until the ion conductivity measured less than 20 micro-Ohms. The resulting material was filtered and dried at 60° C. in a vacuum oven.

4.2 Production of a Silver Oxide Cathode Material Including a $ZnO$—$Al_2O_3$ Stabilizing Agent A 2000 ml beaker was placed into a hot water bath and an overhead stirring propeller was installed. A total of 116.7 g of $AgNO_3$ and 1000 g of DI water were added to the reaction container and stirred at a stir speed of 400 rpm. Then, 12 mg $ZnO$—$Al_2O_3$ was dispersed in 100 g DI water then added. Next, 0.11 g of gelatin was added, and the flask was heated to 55° C.

In a plastic container, 260 g of KOH solution (1.4 g/ml) was mixed with 260 g of DI water to produce a diluted KOH solution. The diluted KOH solution was added to the heated reaction container using a MasterFlex pump. Next, 198 g of potassium persulfate was added at 65° C. After the addition of the potassium persulfate, the reaction flask was maintained at 65° C. for 50 min.

The stirring was stopped and the AgO particles settled to the bottom of the flask. The water was demayted. The particles were rinsed with DI water, and when the particles settled the water was demayted again. The rinse and demayt process was repeated until the ion conductivity of the mixture dropped below 20 micro-Ohms. The resulting material was filtered and dried at 60° C. in a vacuum oven.

This process generated ~85 g of AgO (yield >99%).

In a 2 L Erlenmeyer flask, 78 g of the dry AgO powder, produced above, was added to 780 g of DI water. The mixture was stirred with overhead stirrer using a stir speed of 400 rpm. Then, 3.04 g of lead acetate trihydrate was dissolved in 50 g DI water and added dropwise to the AgO mixture with a MasterFlex pump. Once the addition was completed, the lead solution container was rinsed with 50 g DI water twice and the dropwise addition continued.

Sixty minutes after the lead acetate addition, stirring was stopped, the AgO particles settled, and the water was demayted. The rinse and demayt procedure was repeated until the ion conductivity measured less than 20 micro-Ohms. The resulting material was filtered and dried at 60° C. using a vacuum oven.

4.3 Production of a Silver Oxide Cathode Doped with 0.9% Ga

The following methods were used to generate AgO doped with 0.9% gallium.

Materials:
Silver nitrate: A.C.S. grade, DFG
Gallium (III) nitrate hydrate: 99.9% metals basis, Aldrich
Gelatin from bovine skin, type B, ~225 bloom, Sigma
Potassium hydroxide solution: KOH solution, 1.4 g/ml, LabChem., Inc.
Potassium persulfate, 99+%, Sigma-Aldrich A 2L Aceglass reactor was placed into a hot water bath and a Teflon-coated radial propeller was used. Next, 116.7 g of $AgNO_3$ and 1000 g of DI water were added to the reactor and stirred at 400 rpm. Then, 0.77 g Gallium (III) nitrate hydrate was dissolved in 100 g DI water and added to the reactor. The mixture in the reactor was heated to 55° C. Next, 0.11 g gelatin was added. In a plastic container, 240 g of KOH solution (1.4 g/ml) was mixed with 240 g DI water to give a diluted KOH solution. The diluted KOH solution was added to the reactor per pump at 55° C. The mixture was heated to 65° C., 198 g of potassium persulfate was added, and the temperature was maintained for 50 min. The water was demayted as the solution cooled down, and the particles settled. The particles were rinsed with DI water, and once the particles settled, the water was demayted. The particles underwent this rinse and demayt process until the ion conductivity of the mixture measured below 25 micro-Ohm. The product was filtered and dried in a vacuum oven at 60° C.

The following example cathode was generated using the procedure described above:

| Cathode Formulation | Activity | Resistivity (Ohm · cm) | Particle Size (μm) | | |
|---|---|---|---|---|---|
| | | | D10 | D50 | D95 |
| 0.9 mol % Ga doped AgO | 97 | 17.6 | 0.44 | 1.52 | 3.43 |

Example 5

Evaluation of Electrochemical Cells Containing Cellulosic Separators and Methyl-Capped PEG The cathodes prepared in Examples 4.1-4.3 are employed in an electrochemical cell (see, e.g., FIG. 1) to evaluate the effect of methyl-capped PEG on cell-cycle life in cells containing cellulose separators. The cycle life of the test cells is ascertained by repeatedly cycling the cell attendant to a charge-discharge algorithm wherein the freshly prepared cell, having a 100% SOC equal to about 100% of its rated capacity, is discharged to about 100% of its depth of discharge, i.e., discharged to about 100% DOD, and then re-charged to about 100% SOC, wherein it is again discharged to about 100% DOD. During each cycle, the actual capacity of the cell, i.e., the cell's capacity at 100% SOC, is observed and used to develop a plot of the cell's actual capacity against the number of charge cycles in which the cell is subjected.

Test cells are constructed, using cathodes incorporating the cathode materials described in Example 4. A methyl-capped PEG electrolyte is introduced into one set of electrochemical cells, and comparative cells, e.g., control cells, are constructed using electrolytes without methyl-capped PEG. Each of the cells is constructed from the following materials:

Anode:
Anode Active Material is formulated from 81.9% Zinc, 5% PTFE binder [DuPont TE3859], 12.7% zinc oxide (AZO66), and 0.45% $Bi_2O_3$, to give a final mass of 3.6 g. Each of these ingredients was obtained from commercial sources.

Anode Current Collector: In/brass 32 (80/20), 43 mm×31 mm, pressed at 2 T, a commercial product of Dexmet (Wallingford, Conn.).

Anode Adsorber Wrap: Solupor (commercially available from Lydall, Inc. of Rochester N.H.).

Cathode:

Cathode Active material is formulated from 3% PTFE binder (DuPont TE3859) and cathode material from Examples 4.1, 4.2, or 4.3, depending on the cell, to give a final mass of 5.85 g.

Cathode Current Collector: silver, commercial product of Dexmet. Cathode was pressed at 5.5 T.

Cathode Adsorber Wrap: SL6-8 (commercially available from Shanghai Shilong Hi-Tech Co., LTD.).

Electrode Separators:

2 adjacent cellulose separators are employed, wherein one separator is formed from Innovia 32 soaked with 1 ml electrolyte and the second separator is formed from Innovia 32 (separator materials are commercially available from Innoviafilms, Ltd. of Wigton, Cumbria, U.K.).

Electrolyte:

The electrolyte (Electrolyte A) prepared as in Example 1 (i.e., containing methyl-capped PEG) is used. In the comparative cells, an electrolyte formulated from 32% aqueous KOH and NaOH (in an 80:20 wt % ratio), i.e., without methyl-capped PEG, is used.

Cell Housing:

Aluminum laminated film (D-EL40H(II)) from Pred Material International is used as cell housing.

Each of the cells is evaluated via charge-discharge cycle testing, wherein the cells are charged to about 100% of their rated capacities and discharged of the cells' actual capacity.

Other Embodiments

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely example embodiments of the present invention. One skilled in the art will readily recognize from such discussion and from the accompanying drawings and claims, that various changes, modifications and variations may be made therein without departing from the spirit and scope of the invention as defined in the following claims.

What is claimed is:

1. An electrolyte comprising alkyl-capped PEG; an alkaline agent; and water, wherein the electrolyte comprises from 62 wt % to 80 wt % water.

2. The electrolyte of claim 1, wherein the alkyl-capped PEG has a mean molecular weight of from about 250 amu to about 2000 amu.

3. The electrolyte of claim 1, wherein the alkyl-capped PEG comprises methyl-capped PEG (mPEG), ethyl-capped PEG (ePEG), propyl-capped PEG (pPEG), or any combination thereof.

4. The electrolyte of claim 1, wherein the alkyl-capped PEG has a glass transition temperature of −20° C. or less.

5. The electrolyte of claim 1, further comprising from about 30 wt % to about 39.9 wt % of alkaline agent by weight of the electrolyte.

6. The electrolyte of claim 5, wherein the alkaline agent comprises LiOH, NaOH, KOH, CsOH, RbOH, or any combination thereof.

7. The electrolyte of claim 1, further comprising from about 1 wt % to about 8 wt % of sodium tetraborate by weight of the electrolyte.

8. The electrolyte of claim 1, wherein the alkyl-capped PEG comprises mPEG; and the alkaline agent comprises KOH and NaOH.

9. An electrochemical cell comprising:
an anode comprising Zn;
a cathode comprising a silver material;
a separator comprising cellulose; and
an electrolyte comprising an alkyl-capped PEG; an alkaline agent; and water, wherein the electrolyte comprises greater than 60 wt % of water by weight of the electrolyte.

10. The cell of claim 9, wherein the alkyl-capped PEG has a mean molecular weight of from about 250 amu to about 2000 amu.

11. The cell of claim 10, wherein the alkyl-capped PEG comprises methyl-capped PEG (mPEG), ethyl-capped PEG (ePEG), propyl-capped PEG (pPEG), or any combination thereof.

12. The cell of claim 11, wherein the alkyl-capped PEG has a glass transition temperature of at most about −20° C.

13. The cell of claim 9, wherein the electrolyte comprises at least about 5 wt % but less than 40 wt % of alkaline agent by weight of the electrolyte.

14. The cell of claim 9, wherein the alkaline agent comprises LiOH, NaOH, KOH, CsOH, RbOH, or any combination thereof.

15. The cell of claim 9, wherein the electrolyte comprises from about 1 wt % to about 8 wt % of sodium tetraborate by weight of the electrolyte.

16. The cell of claim 9, wherein the electrolyte comprises about 85 wt % of water by weight of the electrolyte.

17. The electrolyte of claim 1, wherein the alkyl-capped PEG comprises mPEG.

18. The cell of claim 9, wherein the electrolyte comprises from 62 wt % to 80 wt % of water by weight of the electrolyte.

* * * * *